O. O. STORLE.
Horse-Powers.
No. 154,927. Patented Sept. 8, 1874.
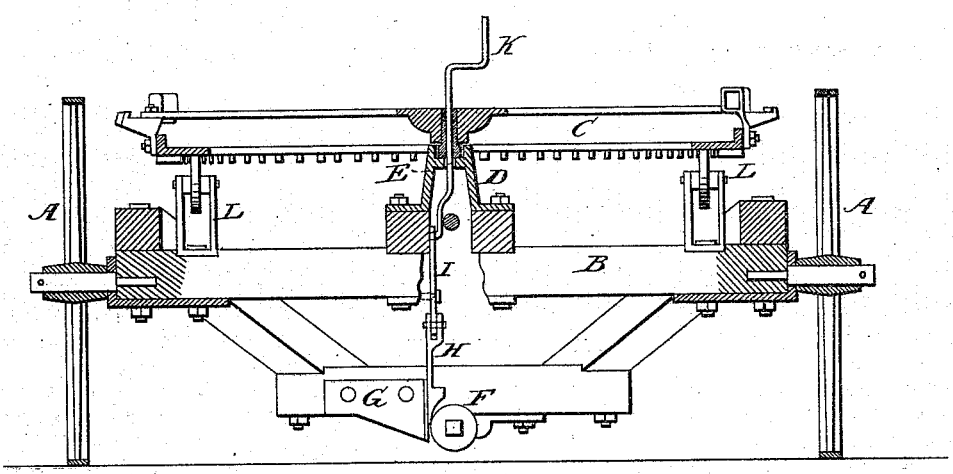
Witnesses.
D. H. Oliver.
E. J. Smith.
Inventor:
Ole O. Storle.
By J. B. Smith
Atty in fact

UNITED STATES PATENT OFFICE.

OLE O. STORLE, OF MILWAUKEE, WISCONSIN, ASSIGNOR OF ONE-HALF HIS RIGHT TO JOHN O. OVERBY, OF SAME PLACE.

IMPROVEMENT IN HORSE-POWERS.

Specification forming part of Letters Patent No. 154,927, dated September 8, 1874; application filed December 23, 1873.

*To all whom it may concern:*

Be it known that I, OLE O. STORLE, of Milwaukee, in the county of Milwaukee, in the State of Wisconsin, have invented certain Improvements in Horse-Powers, of which the following is a specification:

The object of my invention is to even the running of the master-wheel of a horse-power by setting the center-pin so that it may move a little sidewise, and thus permit the master-wheel to adjust itself in that direction, so that it shall work easy.

The drawings forming part of this specification show a sectional view of a horse-power across the center of the master-wheel.

A A are the wheels of the horse-power; B, the axle-tree; C, the master-wheel; D, the pillow-block or bearing under the center of the master-wheel lying on the axle-tree of the horse-power; and in this bearing or pillow-block is a hole for the center-pin, which passes up through the master-wheel. This hole is oblong sidewise, and just the width of the pin the other way, so that the pin may move a little sidewise, and the master-wheel with it. E, the center-pin, with a shoulder on it, standing on and passing through the bearing, and passing up through the master-wheel; F, a roller attached to the tumbling-rod; G, a stud passing down from the frame; H, a brake made in the form of a wedge; I, the shank of the brake passing up through the center-pin, with a handle, K, on its top. This brake, when used to stop or slacken the speed of the power, is thrust down between the roller F, which is on the end of tumbling-rod and the stud G, and, wedging in, operates as a brake. L L, pinions on which the master-wheel runs.

I claim as my invention—

1. A horse-power, with its master-wheel C set on center-pin E, with slot in the pillow-block or bearing D, so that the wheel and pin can move sidewise in order to adjust the wheel without braking, substantially as described.

2. A horse-power with brake H, holder F, stud G, and master-wheel C, in combination with hollow center-pin E, arranged substantially as described.

OLE O. STORLE.

Witnesses:
A. SCHUTTENBERG,
J. B. SMITH.